United States Patent
Flynn et al.

(10) Patent No.: US 9,910,777 B2
(45) Date of Patent: Mar. 6, 2018

(54) ENHANCED INTEGRITY THROUGH ATOMIC WRITES IN CACHE

(71) Applicant: SanDisk Technologies LLC, Plano, TX (US)

(72) Inventors: David Flynn, Sandy, UT (US); Nisha Talagala, Livermore, CA (US)

(73) Assignee: SanDisk Technologies LLC, Plano, TX (US)

( * ) Notice: Subject to any disclaimer, the term of this patent is extended or adjusted under 35 U.S.C. 154(b) by 683 days.

(21) Appl. No.: 13/837,628

(22) Filed: Mar. 15, 2013

(65) Prior Publication Data

US 2013/0205097 A1    Aug. 8, 2013

Related U.S. Application Data

(63) Continuation-in-part of application No. 13/193,559, filed on Jul. 28, 2011, which is a continuation-in-part
(Continued)

(51) Int. Cl.
*G06F 12/0815* (2016.01)
*G06F 12/02* (2006.01)
(Continued)

(52) U.S. Cl.
CPC ........ *G06F 12/0815* (2013.01); *G06F 3/0619* (2013.01); *G06F 3/0643* (2013.01);
(Continued)

(58) Field of Classification Search
None
See application file for complete search history.

(56) References Cited

U.S. PATENT DOCUMENTS

| 5,193,184 A | 3/1993 | Belsan et al. |
| 5,261,068 A | 11/1993 | Gaskins et al. |

(Continued)

FOREIGN PATENT DOCUMENTS

| CN | 1771495 | 5/2006 |
| GB | 0123416 | 9/2001 |

(Continued)

OTHER PUBLICATIONS

Adaptec. "Understanding Read and Write Caching." <http://ask.adaptec.com/app/answers/detail/a_id/2046/~/understanding-read-and-write-caching>. Published Mar. 12, 2001.*
(Continued)

*Primary Examiner* — Charles Rones
*Assistant Examiner* — Hewy Li
(74) *Attorney, Agent, or Firm* — Loza & Loza, LLP; Gabriel Fitch

(57) ABSTRACT

A system and method facilitate processing atomic storage requests. The method includes receiving, from a storage client, an atomic storage request for a first storage device that is incapable of processing atomic write operations. The method also includes processing the atomic storage request at a translation interface. The method also includes storing the atomic storage request in one or more storage operations in a second storage device capable of processing the atomic storage request.

25 Claims, 5 Drawing Sheets

Related U.S. Application Data of application No. 12/879,004, filed on Sep. 9, 2010, now Pat. No. 8,578,127, application No. 13/837,628, which is a continuation-in-part of application No. 13/335,922, filed on Dec. 22, 2011, now Pat. No. 8,725,934.

(60) Provisional application No. 61/368,564, filed on Jul. 28, 2010, provisional application No. 61/382,816, filed on Sep. 14, 2010, provisional application No. 61/579,627, filed on Dec. 22, 2011.

(51) Int. Cl.
*G06F 3/06* (2006.01)
*G06F 11/14* (2006.01)

(52) U.S. Cl.
CPC .......... *G06F 3/0679* (2013.01); *G06F 3/0688* (2013.01); *G06F 11/1471* (2013.01); *G06F 12/0246* (2013.01); *G06F 2212/7201* (2013.01); *G06F 2212/7207* (2013.01)

(56) References Cited

U.S. PATENT DOCUMENTS

| | | |
|---|---|---|
| 5,325,509 A | 6/1994 | Lautzenheiser |
| 5,404,485 A | 4/1995 | Ban |
| 5,414,840 A | 5/1995 | Rengarajan et al. |
| 5,438,671 A | 8/1995 | Miles |
| 5,499,367 A * | 3/1996 | Bamford ............ G06F 11/1471 |
| 5,504,882 A | 4/1996 | Chai |
| 5,535,399 A | 7/1996 | Blitz et al. |
| 5,553,261 A | 9/1996 | Hasbun et al. |
| 5,594,883 A | 1/1997 | Pricer |
| 5,598,370 A | 1/1997 | Nijima et al. |
| 5,651,133 A | 7/1997 | Burkes |
| 5,682,497 A | 10/1997 | Robinson |
| 5,682,499 A | 10/1997 | Bakke et al. |
| 5,701,434 A | 12/1997 | Nakagawa |
| 5,754,563 A | 5/1998 | White |
| 5,802,602 A | 9/1998 | Rahman et al. |
| 5,832,515 A * | 11/1998 | Ledain ................ G06F 3/0619 |
| 5,845,329 A | 12/1998 | Onishi et al. |
| 5,960,462 A | 9/1999 | Solomon et al. |
| 6,000,019 A | 12/1999 | Dykstal et al. |
| 6,014,724 A | 1/2000 | Jennett |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,236,593 B1 | 5/2001 | Hong et al. |
| 6,256,642 B1 | 7/2001 | Krueger et al. |
| 6,311,290 B1 | 10/2001 | Hashbun et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,480,933 B1 | 11/2002 | Cargemel et al. |
| 6,507,911 B1 | 1/2003 | Langford |
| 6,523,102 B1 | 2/2003 | Dye et al. |
| 6,535,997 B1 | 3/2003 | Janson |
| 6,564,285 B1 | 5/2003 | Mills |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,725,342 B1 * | 4/2004 | Coulson ............... G06F 12/0804 |
| | | 711/135 |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,785 B2 | 8/2004 | Piccirillo et al. |
| 6,865,657 B1 | 3/2005 | Traversat et al. |
| 6,877,076 B1 | 4/2005 | Cho et al. |
| 6,880,049 B2 | 4/2005 | Gruner et al. |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,973,551 B1 | 12/2005 | Walton |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,043,599 B1 | 5/2006 | Ware et al. |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,176,953 B2 | 1/2007 | Megiddo et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,257,690 B1 | 8/2007 | Baird |
| 7,275,135 B2 | 9/2007 | Coulson |
| 7,305,520 B2 | 12/2007 | Voight et al. |
| 7,310,711 B2 | 12/2007 | New et al. |
| 7,340,558 B2 | 3/2008 | Lee et al. |
| 7,340,566 B2 | 3/2008 | Voth |
| 7,395,384 B2 | 7/2008 | Sinclair |
| 7,398,348 B2 | 7/2008 | Moore et al. |
| 7,415,575 B1 | 8/2008 | Tong et al. |
| 7,450,420 B2 | 11/2008 | Sinclair et al. |
| 7,487,320 B2 | 2/2009 | Bansal et al. |
| 7,516,267 B2 | 4/2009 | Coulson et al. |
| 7,529,905 B2 | 5/2009 | Sinclair |
| 7,552,271 B2 | 6/2009 | Sinclair et al. |
| 7,603,532 B2 | 10/2009 | Rajan et al. |
| 7,610,348 B2 | 10/2009 | Kisley et al. |
| 7,644,239 B2 | 1/2010 | Ergan et al. |
| 7,725,628 B1 | 5/2010 | Phan et al. |
| 7,743,210 B1 | 6/2010 | Jernigan et al. |
| RE20,533 E | 8/2010 | Phan et al. |
| 7,873,782 B2 | 1/2011 | Terry |
| 7,930,326 B2 | 4/2011 | Doucette et al. |
| 7,970,770 B2 | 6/2011 | Edwards |
| 8,205,060 B2 | 6/2012 | Hahn et al. |
| 8,417,901 B2 | 4/2013 | Lin |
| 8,489,820 B1 * | 7/2013 | Ellard ................ G06F 12/0246 |
| | | 711/120 |
| 8,607,028 B2 | 12/2013 | Kale et al. |
| 8,904,091 B1 | 12/2014 | Guda et al. |
| 9,015,209 B2 | 4/2015 | Hahn et al. |
| 2002/0069317 A1 | 6/2002 | Chow et al. |
| 2002/0069318 A1 | 6/2002 | Chow et al. |
| 2002/0103819 A1 | 8/2002 | Duvillier et al. |
| 2002/0181134 A1 | 12/2002 | Bunker et al. |
| 2003/0028726 A1 | 2/2003 | Gaertner et al. |
| 2003/0061296 A1 | 3/2003 | Craddock et al. |
| 2003/0145230 A1 | 7/2003 | Chiu et al. |
| 2003/0163630 A1 | 8/2003 | Aasheim et al. |
| 2003/0198084 A1 | 10/2003 | Fujisawa et al. |
| 2004/0003002 A1 | 1/2004 | Adelmann |
| 2004/0044840 A1 | 3/2004 | Wong |
| 2004/0128470 A1 * | 7/2004 | Hetzler ............... G06F 12/0804 |
| | | 711/209 |
| 2004/0186946 A1 | 9/2004 | Lee |

(56) References Cited

U.S. PATENT DOCUMENTS

| | | |
|---|---|---|
| 2004/0268064 A1* | 12/2004 | Rudelic .............. G06F 11/1433 711/156 |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0193166 A1 | 9/2005 | Johnson et al. |
| 2005/0240713 A1 | 10/2005 | Wu |
| 2005/0246487 A1* | 11/2005 | Ergan .................. G06F 3/061 711/113 |
| 2005/0246510 A1 | 11/2005 | Retnamma et al. |
| 2005/0267882 A1 | 12/2005 | Aupperlee et al. |
| 2005/0273476 A1 | 12/2005 | Wertheimer |
| 2006/0004955 A1 | 1/2006 | Ware et al. |
| 2006/0075057 A1 | 4/2006 | Gildea et al. |
| 2006/0095659 A1 | 5/2006 | New et al. |
| 2006/0129778 A1 | 6/2006 | Clark et al. |
| 2006/0143396 A1 | 6/2006 | Cabot |
| 2006/0149893 A1 | 7/2006 | Barfuss et al. |
| 2006/0153026 A1 | 7/2006 | Blacquiere et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0248387 A1 | 11/2006 | Nicholson et al. |
| 2006/0265636 A1 | 11/2006 | Hummler |
| 2006/0294300 A1 | 12/2006 | Lubbers |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0043915 A1 | 2/2007 | Moir et al. |
| 2007/0050571 A1 | 3/2007 | Nakamura |
| 2007/0083530 A1 | 4/2007 | Lakshminath et al. |
| 2007/0088666 A1 | 4/2007 | Saito |
| 2007/0118713 A1 | 5/2007 | Guterman et al. |
| 2007/0143560 A1 | 6/2007 | Gorobets |
| 2007/0143561 A1 | 6/2007 | Gorobets |
| 2007/0147356 A1 | 6/2007 | Gorobets |
| 2007/0156998 A1 | 7/2007 | Gorobets |
| 2007/0169030 A1 | 7/2007 | Tarditi, Jr. et al. |
| 2007/0198770 A1 | 8/2007 | Horri et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0266037 A1 | 11/2007 | Terry |
| 2007/0274150 A1 | 11/2007 | Gorobets |
| 2007/0276994 A1 | 11/2007 | Caulkins et al. |
| 2007/0294474 A1* | 12/2007 | Panabaker .......... G06F 12/0868 711/113 |
| 2007/0300008 A1 | 12/2007 | Rogers et al. |
| 2008/0005220 A1 | 1/2008 | Tsunakawa et al. |
| 2008/0010395 A1 | 1/2008 | Mylly et al. |
| 2008/0046443 A1* | 2/2008 | Fachan ............... G06F 12/0804 |
| 2008/0052477 A1 | 2/2008 | Lee |
| 2008/0126507 A1 | 5/2008 | Wilkinson |
| 2008/0140737 A1 | 6/2008 | Garst et al. |
| 2008/0141043 A1 | 6/2008 | Flynn et al. |
| 2008/0163220 A1 | 7/2008 | Wang et al. |
| 2008/0195798 A1 | 8/2008 | Lee et al. |
| 2008/0228992 A1 | 9/2008 | Dumitru et al. |
| 2008/0243966 A1 | 10/2008 | Croisettier |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0288819 A1 | 11/2008 | Heller, Jr. |
| 2008/0320209 A1 | 12/2008 | Lee et al. |
| 2008/0320253 A1 | 12/2008 | Tomlin et al. |
| 2009/0125700 A1 | 5/2009 | Kisel |
| 2009/0132760 A1 | 5/2009 | Flynn et al. |
| 2009/0150599 A1 | 6/2009 | Bennett |
| 2009/0150605 A1 | 6/2009 | Flynn et al. |
| 2009/0222596 A1 | 9/2009 | Flynn et al. |
| 2009/0248763 A1 | 10/2009 | Rajan |
| 2009/0287887 A1 | 11/2009 | Matsuki |
| 2009/0292861 A1 | 11/2009 | Kanevsky et al. |
| 2010/0005228 A1 | 1/2010 | Fukutomi |
| 2010/0005255 A1 | 1/2010 | Kaushik et al. |
| 2010/0082529 A1 | 4/2010 | Mace et al. |
| 2010/0095059 A1 | 4/2010 | Kisley et al. |
| 2010/0153660 A1 | 6/2010 | Lasser |
| 2010/0205335 A1 | 8/2010 | Phan et al. |
| 2010/0211737 A1 | 8/2010 | Flynn et al. |
| 2010/0262738 A1 | 10/2010 | Swing et al. |
| 2010/0262740 A1 | 10/2010 | Borchers et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0066792 A1 | 3/2011 | Shaeffer et al. |
| 2011/0119446 A1 | 5/2011 | Blumrich et al. |
| 2011/0208915 A1 | 8/2011 | Bannon et al. |
| 2011/0225364 A1 | 9/2011 | Edwards |
| 2011/0296133 A1 | 12/2011 | Flynn et al. |
| 2011/0320733 A1* | 12/2011 | Sanford .............. G06F 12/0871 711/135 |
| 2012/0030408 A1 | 2/2012 | Flynn et al. |
| 2012/0059978 A1 | 3/2012 | Rosenband et al. |
| 2012/0110108 A1 | 5/2012 | Li et al. |
| 2012/0297140 A1 | 11/2012 | Wu et al. |
| 2012/0320209 A1 | 12/2012 | Rosenband et al. |
| 2013/0166829 A1 | 6/2013 | Dumitru |

FOREIGN PATENT DOCUMENTS

| | | |
|---|---|---|
| WO | 200201365 | 1/2002 |
| WO | 2004099989 | 11/2004 |
| WO | 2005103878 | 11/2005 |
| WO | 2006065626 | 6/2006 |
| WO | 2008130799 | 3/2008 |
| WO | 2011106394 | 9/2011 |

OTHER PUBLICATIONS

IEEE Dictionary, "Atomic transaction," 7th edition, Published in 2000, Last updated Feb. 27, 2007.

Notice of Allowance and Fee(s) Due for U.S. Appl. No. 13/725,728, filed Dec. 21, 2012, and dated from the USPTO Oct. 19, 2015, 23 pgs.

Randal, Paul S., "Understanding Logging and Recovery in SQL Server," Published Feb. 2009; URL https:// technet.microsoft.com/en-us/magazine/2009.02.logging.aspx; accessed Sep. 11, 2015.

Russinovich, Mark E., "Windows Internals, Fifth Edition," Chapters 11-12: "Common Log File System," "NTFS Design Goals and Features," Published Jun. 17, 2009.

United States Patent Office, Final Office Action, U.S. Appl. No. 13/193,559, dated Dec. 6, 2014.

United States Patent Office, Final Office Action, U.S. Appl. No. 14/087,297, dated Nov. 26, 2014.

United States Patent Office, Non-Final Office Action, U.S. Appl. No. 13/107,820, dated Feb. 22, 2013.

United States Patent Office, Non-Final Office Action, U.S. Appl. No. 13/335,922, dated Aug. 29, 2013.

United States Patent Office, Non-Final Office Action, U.S. Appl. No. 13/539,235, dated Feb. 13, 2015.

United States Patent Office, Non-Final Office Action, U.S. Appl. No. 13/725,728, dated May 21, 2015.

United States Patent Office, Non-Final Office Action, U.S. Appl. No. 14/087,297, dated Aug. 14, 2014.

United States Patent Office, Non-Final Office Action, U.S. Appl. No. 14/087,297, dated Mar. 11, 2015.

United States Patent Office, Pre-Interview Communication, U.S. Appl. No. 13/193,559, dated Jul. 8, 2014.

(56) References Cited

OTHER PUBLICATIONS

Weissel, Andreas, "Revisiting Log-Structured File Systems for Low-Power Portable Storage," Published Mar. 2005; Accessed at URL: <https://www4.cs.fau.de/-weissei/Publications/Papers/IWSSPS05.pdf>.
Wikipedia, "Journaling File System," Published on Jul. 4, 2009; URL: <https://en.wikipedia.org/wiki/Journaling_file_system>.
Wikipedia, "Transaction log," Published on Jul. 4, 2009; URL: <https://en.wikipedia.org/wiki/Transaction_log>.
Final Office Action for U.S. Appl. No. 13/539,235, filed Jun. 29, 2012, and dated from the USPTO Nov. 9, 2015, 20 pgs.
European Search Report dated Nov. 7, 2013 for EP 11813216.
International Report on Patentability dated Nov. 22, 2012 for PCT/US2011/036539.
International Search Report dated Apr. 6, 2012 for PCT/US2011/045801.
Actel, et al., Actel Fusion FPGAs Supporting Intelligent Peripheral Management Interface (IPMI) Applications, htt;://www.actel.com/documents/Fusion_IPMI_AN.pdf, Oct. 1, 2006, visited Mar. 11, 2010.
Anonymous, et al., Method for Fault Tolerance in Nonvolatile Storage, http://ip.com, IP.com No. IPCOM000042269D, 2005.
Ari, et al., Performance Boosting and Workload Isolation in Storage Area Networks with SanCache, Hewlett Packard Laboratories, Proceedings of the 23rd IEEE/ 14th NASA Goddard Conference on Mass Storage Systems and Technologies (MSST 2006), May 2006, pp. 263-327.
Arpaci-Dusseau, et al., Removing the Costs of Indirection in Flash-Based SSDs with Nameless Writes, Jun. 2010, HotStorage'10, Boston, MA.
Asine, et al., ASPMC-660 Rugged IDE Flash Drive PMV Module, http://www.asinegroup.com/products/aspmc660.html, copyright 2002, visited Nov. 8, 2009.
Bitmicro, et al., BITMICRO Introduces E-Disk PMC Flash Disk Module at Military & Aerospace Electronics East 2004, http://www.bitmicro.com/press.sub, published May 18, 2004, visited Mar. 8, 2011.
Brandon Jr.,Daniel et al., Sparse Matrices in CS Education, Christian Brothers University, 650 East Parkway South, Memphis, Tennessee 38104, 2009, pp. 93-98, May 2009.
Chao, et al., Mime: a High Performance Parallel Storage Device with Strong Recovery Guarantees, Technical Report HPL-CSP-92-9, Hewlett-Packard Laboratories, 1992.
Coburn, et al., NV-Heaps: Making Persistent Objects Fast and Safe with Next-Generation, Non-Volatile Memories, Department of Computer Science and Engineering, University of California, San Diego, ASPLOS '11, Mar. 5-11, 2011, Newport Beach, California, ACM 978-1-4503-0266-Jan. 11, 2003, Mar. 5, 2011.
Dan, et al., Implementing MLC NAND Flash for Cost-Effective, High-Capacity Memory, M-Systems, White Paper, 91-SR-014-02-8L, Rev 1.1, Sep. 2003.
Elnec, et al., NAND Flash Memories and Programming NAND Flash Memories Using ELNEC Device Programmers, Application Note, published Mar. 1, 2007.
Flynn, et al., Final Office Action dated Nov. 28, 2016 for U.S. Appl. No. 13/193,559.
Flynn, et al., Non-Final Office Action dated Mar. 18, 2016 for U.S. Appl. No. 13/193,559.
Gal, et al., A Transactional Flash File System for Microcontrollers, School of Computer Science, Tel-Aviv University, USENIX Association, 2005 USENIX Annual Technical Conference, pp. 89-104.
Garfinkel, et al., One Big File is Not Enough: A Critical Evaluation of the Dominant Free-Space Sanitation Technique, 6th Workshop on Privacy Enhancing Technologies, Cambridge, United Kingdom, published Jun. 1, 2006.
Granger, et al., Soft Updates: a Solution to the Metadata Update Problem in file Systems, ACM Transactions on computer Systems (TOCS) 181 (2000): 127-153.
Gutmann, et al., Secure Deletion of Data from Magnetic and Solid-State Memory, USENIX, 14 pages, San Jose, CA, published Jul. 1, 1996.
Kawaguchi, et al., A Flash-Memory Based File System, Advanced Research Laboratory, Hitachi, Ltd., 1995.
Macko, et al., Tracking Back References in a Write-Anywhere File Systems, Proceedings of the 8th USENIX Conference on File and Storage Technologies, (2010), 3 pages.
Meisner, et al., Object-Based Storage, IEEE Communications Magazine, Aug. 2003, pp. 84-90.
Micron Technology, Inc., et al., NAND Flash 101: An Introduction to NAND Flash and How to Design it into your Next Product (TN-29-19), http://www.micron.com/~/media/Documents/Products/Technical%20Note/NAND%20Flash/145tn2919_nand_101.pdf, 2006, visited May 10, 2010.
Morgenstern,David et al., Is There a Flash Memory RAID in your Future?, http://www.eweek.com—eWeek, Ziff Davis Enterprise Holdings Inc., Nov. 8, 2006, visited Mar. 18, 2010.
Novell, et al., File System Primer, http://wiki.novell.com/indiex.php/File_System_Primer, 2006, visited Oct. 18, 2006.
Plank, et al., A Tutorial on Reed-Solomon Coding for Fault Tolerance in RAID-like System, Department of Computer Science, University of Tennessee, pp. 995-1012, Sep. 1997.
Porter, et al., Operating System Transactions, Department of Computer Sciences, The University of Texas at Austin, SOSP '09, Oct. 11-14, 2009, Big Sky, Montana, ACM 978-1-60558-752-Mar. 9, 2010, Oct. 2009.
Rosenblum, et al., The Design and Implementation of a Log-Structured File System, ACM Transactions on computer Systems (TOCS) 10.1 (1992): 26-52.
Samsung Electronics, et al., Introduction to Samsung's Linux Flash File System—RFS Application Note, Version 1.0, Nov. 2006.
Sears, et al., Stasis: Flexible Transactional Storage, University of California, Berkeley, USENIX Association, OSDI 06: 7th USENIX Symposium on Operating Systems Design and Implementation, pp. 29-44, Nov. 6, 2006.
Seltzer, et al., File System Performance and Transaction Support, A.B. (Harvard/Radcliffe College) 1983, A dissertation submitted in partial satisfaction of the requirements of the degree of Doctor of Philosophy in Computer Science in the Graduate Division of the University of California at Berkeley, 1992.
Seltzer, et al., Transaction Support in a Log-Structured File System, Data Engineering, 1993, Proceedings. Ninth International Conference on. IEEE, 1993.
Seltzer, et al., Transaction Support in Read Optimized and Write Optimized File Systems, Department of Electrical Engineering and Computer Science, University of California Berkeley, California 94720, Proceedings of the 16th VLDB Conference, Brisbane, Australia, 1990.
Spansion, et al., Data Management software (DMS) for AMD Simultaneous Read/Write Flash Memory Devices, published Jul. 7, 2003.
Spillane, et al., Enabling Transactional File Access Via Lightweight Kernel Extensions, Appears in the Proceedings of the 7th USENIX Conference on File and Storage Technologies (FAST '09), Stony Brook University, IBM T.J. Watson Center, Feb. 25, 2009.
Tal, et al., NAND vx. NOR Flash Technology, M-Systems, www2.electronicproducts.com/PrintArticle.aspx?ArticleURL-FEBMSY1.feb2002.html, visited Nov. 22, 2010.
Van Hensbergen, et al., Dynamic Policy Disk Caching for Storage Networking, IBM Research Division, RC24123 (WO611-189), Nov. 2006.
Volos, et al., Mnemosyne: Lightweight Persistent Memory, Computer Sciences Department, University of Wisconsin-Madison, Skype Limited, ASPLOS '11, Mar. 5-11, 2011, Newport Beach, California, ACM 978-1-4503-0266-Jan. 11, 2003, Mar. 5, 2011.
Wright,Charles P. et al., Extending ACID Semantics to the File System, IBM T.J. Watson Research Center, Stony Brook University, ACM Transactions on Storage, vol. 3, No. 2, May 2007, pp. 1-40.
Wu, et al., eNVy: A Non-Volatile, Main Memory Storage System, Department of Electrical and Computer Engineering, Department of Computer Science, Rice University, ASPLOS VI-10/94 San Jose, California, 1994, ACM 0-89791-660-3/94/0010, pp. 86-97, 1994.

(56) References Cited

OTHER PUBLICATIONS

Flynn, et al., Office Action dated Aug. 31, 2017 for US Appl. No. 13/193,559.

* cited by examiner

ENHANCED INTEGRITY THROUGH ATOMIC WRITES IN CACHE

CROSS-REFERENCE TO RELATED APPLICATIONS

This application is a continuation-in-part of U.S. patent application Ser. No. 13/193,559, filed on Jul. 28, 2011 and entitled "Apparatus, System, and Method for Atomic Storage Operations," which is a continuation-in-part of U.S. patent application Ser. No. 12/879,004, filed on Sep. 9, 2010 and entitled "Apparatus, System, and Method for Allocating Storage." application Ser. No. 12/879,004 claims priority of U.S. Provisional Patent Application No. 61/368,564, filed on Jul. 28, 2010 and entitled "Apparatus, System, and Method for Writing Data to Storage Media in a Single Atomic Operation," and U.S. Provisional Patent Application No. 61/382,816, filed on Sep. 14, 2010 and entitled "Atomic Writes," all of which are incorporated by reference herein. This application is also a continuation-in-part of U.S. patent application Ser. No. 13/335,922, filed on Dec. 22, 2011 and entitled "Methods and Apparatuses for Atomic Storage Operations," which claims the benefit of priority of U.S. Provisional Patent Application 61/579,627, filed on Dec. 22, 2011 and entitled "Methods and Apparatuses for Atomic Storage Operations," all of which are incorporated by reference herein.

BACKGROUND

Computer applications that store large amounts of data rely on what is known as a backing store to store the data. Examples of backing stores include hard disk drives, storage area networks (SAN), redundant arrays of inexpensive disks (RAID), etc. Memory devices (or "caches") connected to or otherwise in communication with a backing store are able to store data from the backing store. Storing data from the backing store on the cache allows the data to be quickly accessible to an operating system or other application, improving application performance over accessing the data directly from the backing store. Many backing stores are hard disk devices that have slower read performance than caches such as flash memory devices.

However, conventional backing stores do not provide atomic guarantees for write operations. If a failure occurs in the middle of a write, the backing store may present any combination of old and new data for the affected write operations after the backing store restarts or recovers.

SUMMARY

Embodiments of a system are described. In one embodiment, the system includes a cache management layer for processing an atomic storage request from a storage client directed to a backing store. The system also includes a translation interface for receiving the atomic storage request from the cache management layer and storing the atomic storage request in a log-based format in one or more storage operations in the cache device. Other embodiments of the system are also described.

Embodiments of a method are also described. In one embodiment, the method is a method for receiving, from a storage client, an atomic storage request for a first storage device that is incapable of processing atomic write operations. The method also includes processing the atomic storage request at a translation interface. The method also includes storing the atomic storage request in one or more storage operations in a second storage device capable of processing the atomic storage request. Other embodiments of the method are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
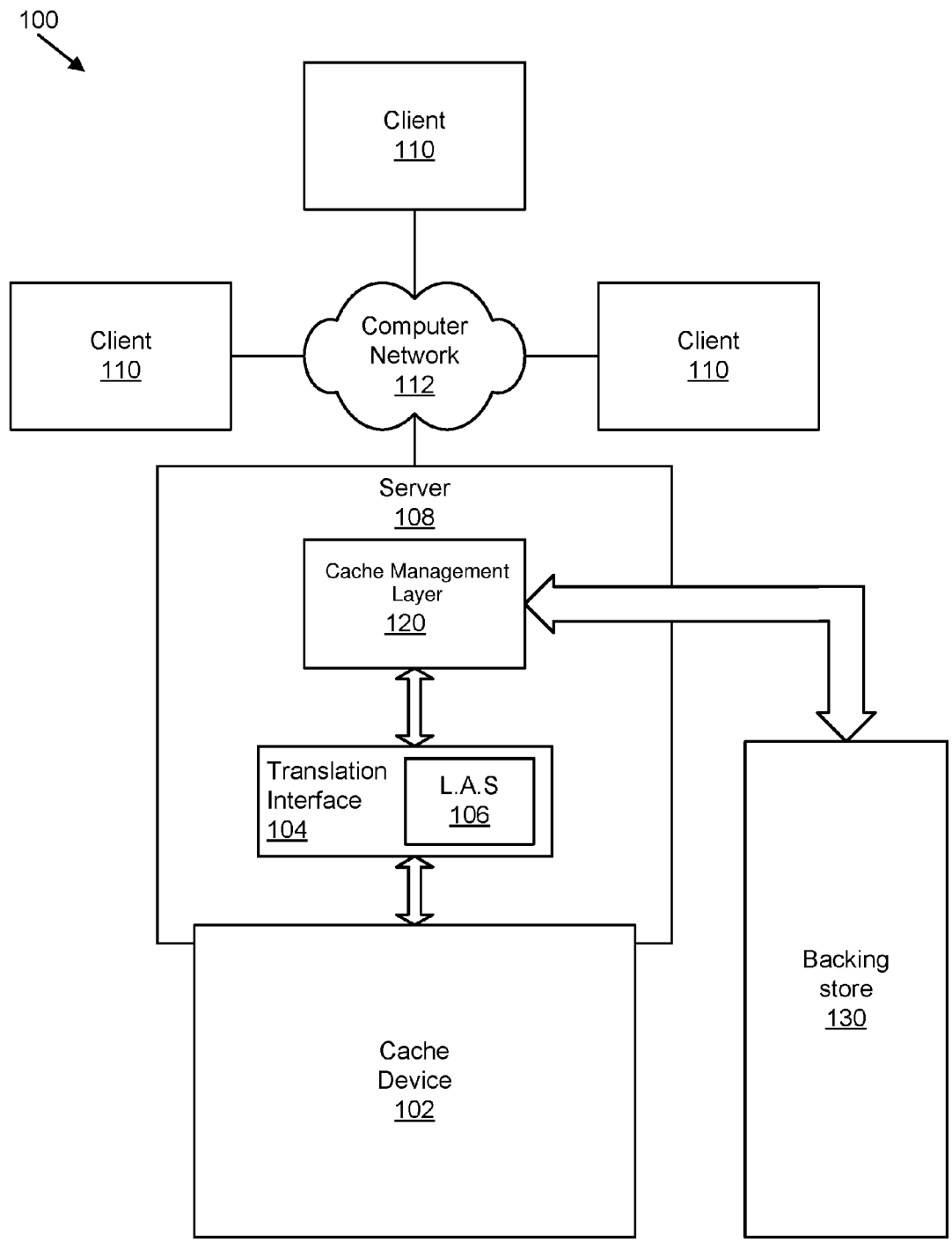
FIG. 1 illustrates one embodiment of a system for enhanced integrity using atomic writes.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference to a computer readable medium may take any physical form capable of storing machine-readable instructions, at least for a time in a non-transient state, on a digital processing apparatus. A computer readable medium may be embodied by a compact disk, digital-video disk, a blu-ray disc, a magnetic tape, a Bernoulli drive, a magnetic disk, flash memory, integrated circuits, or other digital processing apparatus memory device.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

While many embodiments are described herein, at least some of the described embodiments facilitate enabling atomic write operations for storage devices that are not capable of processing atomic write operations. The storage device may be any type of memory device or non-volatile storage device configured to store data. For example, the storage device may be a backing store. The backing store may be any type of backing store, such as a hard disk drive or other type of non-volatile storage device. However, conventional backing stores do not provide atomic guarantees for write operations. Stated differently, if a failure occurs in the middle of a write operation, the backing store may present any combination of old and new data after a recovery.

Embodiments described herein enable atomic guarantees for backing stores that are not capable of processing atomic write operations by, as will be discussed below, notifying a storage client of a capability to process an atomic write operation on behalf of the backing store, redirecting the atomic storage requests to a cache device that is capable of processing atomic write operations, and storing a copy of the atomic write operations in the cache device. The copy of the atomic write operation is later transferred to the backing store via a destage, or write back, operation.

FIG. 1 illustrates one embodiment of a system 100 for enhanced integrity using atomic writes. In the depicted embodiment, the system 100 includes clients 110, a computer network 112, a server 108, a cache management layer 120, a translation interface 104, a cache device 102, and a backing store 130. Other configurations of a system 100 are also possible and may similarly benefit from enhanced integrity. Exemplary system 100 include, but are not limited to, a storage area network (SAN), network attached storage (NAS), a desktop computer, a laptop computer, or other computing environment that may beneficially implement a cache.

The clients 110 (also referred to as "storage clients") are broadly defined as devices that send and receive requests for data. The clients may be computers (such as laptops, desktops, servers, mainframes, etc), mobile devices, or other categories of devices that send and receive digital data. The clients 110 may be directly connected to storage for the digital data (for example, by a bus) or may connected over a network (for example, the Internet).

The computer network 112 is a series of computers and devices connected by communications channels that facilitate communications between users of the attached devices. The network 112 may allow the users to share resources, such as storage. The network 112 may include, for example, network interface cards (NICs), repeaters, hubs, bridges, switches, routers, etc. The computer network 112 may be any of a large area network (LAN), wide area network (WAN), or other variety of computer network. The network 112 may be, for example, implemented in a data center, over the Internet, or in another environment. As noted above, in certain embodiments, the system 100 does not include a computer network 112.

The server 108 may be a workstation, a mainframe, a laptop, or other computing device. In certain embodiments, the server 108 has access to, and is communication with, the cache device 102, via the translation interface 104, and the backing store 130. In certain embodiments, the server 108 manages communications between the clients 110 and the cache device 102 and the backing store 130. For example, the server 108 may be a storage manager. The server 108 may be directly connected to the cache device 102 (for example, via a bus), or indirectly connected (for example, via a network).

The server 108 may implement a file server (described in greater detail below with reference to FIG. 2) to facilitate accessing and writing data to the cache device 102 and the backing store 130. The file server may manage files for the client 110. For example, clients 110 may direct the file server to read, write, delete, modify, or perform another operation for a particular file, object, logical block, or other data unit. The server 108 may view the cache device 102 and the backing store 130 as separate devices. The server 108 may also be presented with a view of unitary storage (such as a logical address space) with the existence and functioning of the cache device 102 hidden from the server 108.

The cache device 102 is a nonvolatile storage device that can store data digitally. The cache device 102 acts as a cache for the backing store 130, which is described below. In certain embodiments, the cache device 102 also includes a driver; in certain embodiments, the cache management layer 120 may communicate directly with the cache device 102 without using an intermediate device driver for the cache device 102. One example of a cache management layer 120 suitable for use according to embodiments of the present disclosure is the directCache® available from Fusion-io, Inc. of Salt Lake City, Utah. For example, the cache management layer 120 may interact with a VolumeManager (VM) either by polling or notification in order to determine when a backing store 130 is added to the system 100. In certain embodiments, the driver gets authorization to activate a cache management layer 120 feature. The cache device 102 typically has faster access characteristics than those of the backing store 130; thus data can generally be read from the cache device 102 faster than data can be read from the backing store 130. The increased speed of the cache device 102 may result from the use of a cache device 102 that uses technology that is generally faster than that of the backing store (e.g., Flash memory cache device and hard disk drive backing store). The increase speed may also result from the nature of the connection; for example, the cache device 102 may be connected using a bus of the server 108 while the backing store 130 is connected using a slower network connection.

The cache device 102 may be realized as a card that connects to the PCIe bus of the server 108. In one embodiment, the cache device 102 is a solid state storage device implemented using NAND Flash memory. For example, the cache device 102 may be a solid state storage device such as those manufactured by Fusion-Io®. In certain embodiments, the cache device 102 may comprise one or more physical devices that cooperate such that they serve as a single logical cache device; for example, multiple memory cards that attach to the PCIe bus of the server 108 may be used as the cache device 102. In such embodiments, the cache management layer 120 may be configured to manage multiple physical devices that make up the cache device 102.

The translation interface 104 provides an interface through which clients 110 perform persistent operations. One example of a translation interface 104 suitable for use according to embodiments of the present disclosure is the Virtual Storage Layer® available from Fusion-io, Inc. of Salt Lake City, Utah. The translation interface 102 simplifies data storage operations for storage clients and exposes enhanced storage features, such as atomicity, transactional support, recovery, etc. The translation interface 104 may comprise a driver, a user-space application, or the like. In some embodiments, the translation interface 104 is implemented in conjunction with the cache management layer 120. The translation interface 104 maintains and presents a logical address space to the clients 110, or other applications, via one or more interfaces and/or APIs provided by the translation interface 104. The applications may include, but are not limited to: operating systems, virtual operating systems (e.g., guest operating systems, hypervisors, etc.), file systems, database applications, server applications, general-purpose applications, and the like. In some embodiments, one or more applications operating on a remote computing device access the translation interface 104 via a network 112.

The translation interface 104, in one embodiment, is configured to perform persistent storage operations on the cache device 102. The translation interface 104 communicates with the cache device 102 via a communication bus which may include, but is not limited to: a PCE-e bus, a network connection (e.g., Infiniband), a storage network, Fibre Channel Protocol (FCP) network, HyperSCSI, or the like.

In some embodiments, the translation interface 104 accesses storage metadata to maintain associations between logical identifiers (e.g., blocks) in the logical address space 106 and physical storage locations on cache device 102. As used herein, a physical storage location may refer to any storage location of the cache device 102, which may include, but are not limited to: storage divisions, erase blocks, storage units, pages, logical pages, logical erase blocks, and so on.

The translation interface 104 maintains "any-to-any" assignments between logical identifiers in the logical address space 106 and physical storage locations on the cache device 102. The translation interface 104 may cause data to be written or updated "out-of-place" on the cache device 102. Writing data "out-of-place" refers to writing updated data to a new physical storage location instead of simply updating the data in the same physical storage location. In some embodiments, data is stored sequentially and in a log-based format. Storing data "out-of-place" provides wear-leveling benefits and addresses "erase-and-program-once" properties of many non-volatile storage devices. Moreover, out-of-place writing (and writing data in logical storage locations as opposed to individual pages) addresses asymmetric properties of the cache device 102. Asymmetric properties refers to the idea that different storage operations (read, write, erase) take very different amounts of time. For example, it may take ten times as long to program data on the cache device 102 as it takes to read data from the cache device 102. Moreover, in some cases, data may only be programmed to physical storage locations that have first been initialized (e.g., erased). An erase operation may take ten times as long as a program operation (and by extension one hundred times as long as a read operation). Associations between logical identifiers in the logical address space 106 and physical storage locations on the cache device 102 are maintained in the storage metadata In some embodiments, the translation interface 104 causes data to be persisted on the cache device 102 in a sequential, log-based format. Sequential, log-based storage may comprise persisting the order of storage operations performed on the cache device 102. In some embodiments, data is stored with persistent metadata that is persisted on the cache device 102 with the data itself. For example, a sequence order of storage operations performed may be maintained using sequence indicators (e.g., timestamps, sequence numbers, or other indicators) that are stored on the non-volatile storage device 402 and/or the current storage location of the cache device 102.

Persisting data in a sequential, log-based format also includes persisting metadata on the cache device 102 that describes the data. The persistent metadata may be stored with the data itself (e.g., in the same program and/or storage operation and/or in the smallest write unit supported by the cache device 102); the persistent metadata may, therefore, be guaranteed to be stored with the data it describes. In some embodiments, data is stored in a container format (e.g., a packet, ECC codeword, etc.). Persistent metadata may be included as part of a packet format of the data (e.g., as a header, footer, or other field within the packet). Alternatively, or in addition, portions of the persistent metadata may be stored separately from the data it describes.

The persistent metadata describes the data and may include, but is not limited to: a logical identifier (or other identifier) of the data, security or access control parameters, sequence information (e.g., a sequence indicator), a persistent metadata flag (e.g., indicating inclusion in an atomic storage operation), a transaction identifier, or the like. The persistent metadata may comprise sufficient information to reconstruct the storage metadata and/or replay the sequence of storage operations performed on the cache device 102.

The sequential, log-based data forms an "event log" of storage operations that are performed on the cache device 102. Accordingly, the translation interface 104 is capable of replaying a sequence of storage operations performed on the cache device 102 by accessing the data stored on the cache device 102 in a particular order that matches the order of the event log. The sequential, log-based data format enables the translation interface 104 to reconstruct the storage metadata, as well as other data, in the event of an invalid shutdown (or other failure condition). Examples of apparatuses, systems, and methods for crash recovery and/or data integrity despite invalid shutdown conditions are described in U.S. application Ser. No. 13/107,920, filed on May 13, 2011 entitled "Apparatus, System, and Method for Conditional and Atomic Storage Operations" and U.S. application Ser. No. 13/330,554, filed on Dec. 19, 2011 entitled "Apparatus, System, and Method for Persistent Data Management on a Non-Volatile Storage Media" both of which claim priority to U.S. Provisional Patent Application No. 61/424,585, filed Dec. 17, 2010 and entitled, "Apparatus, System, and Method for Persistent Management of Data in a Cache Device," and U.S. Provisional Patent Application No. 61/425,167, filed Dec. 20, 2010 and entitled, "Apparatus, System, and Method for Persistent Management of Data in a Cache Device," all of which are hereby incorporated by reference in their entirety.

In some embodiments, the cache device 102 includes a secondary power source (e.g., battery, capacitor, etc.) in the event of an invalid shutdown. The cache device 102, accordingly, creates a "protection domain" or "powercut safe domain." Once data is transferred to within the protection domain, of the cache device 102, it is guaranteed to be persisted on the cache device 102.

The sequential, log-based storage format implemented by the translation interface 104 provides crash-recovery and/or data integrity for the data stored on the cache device 102 as well as the storage metadata. After an invalid shutdown and reconstruction operation, the translation interface 104 may expose the reconstructed storage metadata to the storage applications of the clients 110. The storage applications may, therefore, delegate crash-recovery and/or data integrity to the translation interface 104, which may significantly simplify the storage applications and/or allow the storage applications to operate more efficiently. For example, a file system storage client may require crash-recovery and/or data integrity services for some of its metadata, such as I-node tables, file allocation tables, and so on. The file system storage client may have to implement these services itself, which may impose significant overhead and/or complexity on the file system storage client. The translation interface 104 relieves these duties from the file system storage client. As described above, the translation interface 104 stores data in a sequential, log-based format. As such, in the event of an invalid shutdown, the translation interface 430 is capable of reconstructing the storage metadata and/or identifying the "current" version of data using the sequential, log-based formatted data on the cache device 102. The translation interface 104 provides access to the reconstructed storage metadata and/or data via a translation interface. Accordingly, after an invalid shutdown, a file system storage client may access crash-recovered file system metadata and/or may ensure the integrity of file data accessed through the translation interface 430. As such, the translation interface 104 is configured to guarantee "atomicity." The term "atomicity" or atomic refers to the ability of the translation interface 104 to guarantee that a write operation has been performed successfully, or the write operation did not happen at all. In other words, the translation interface 104 guarantees that a partial write operation does not occur. The write operation either happens successfully, or the write operation is "rolled back" (or "undone") using the log-based storage format.

Figure 2:
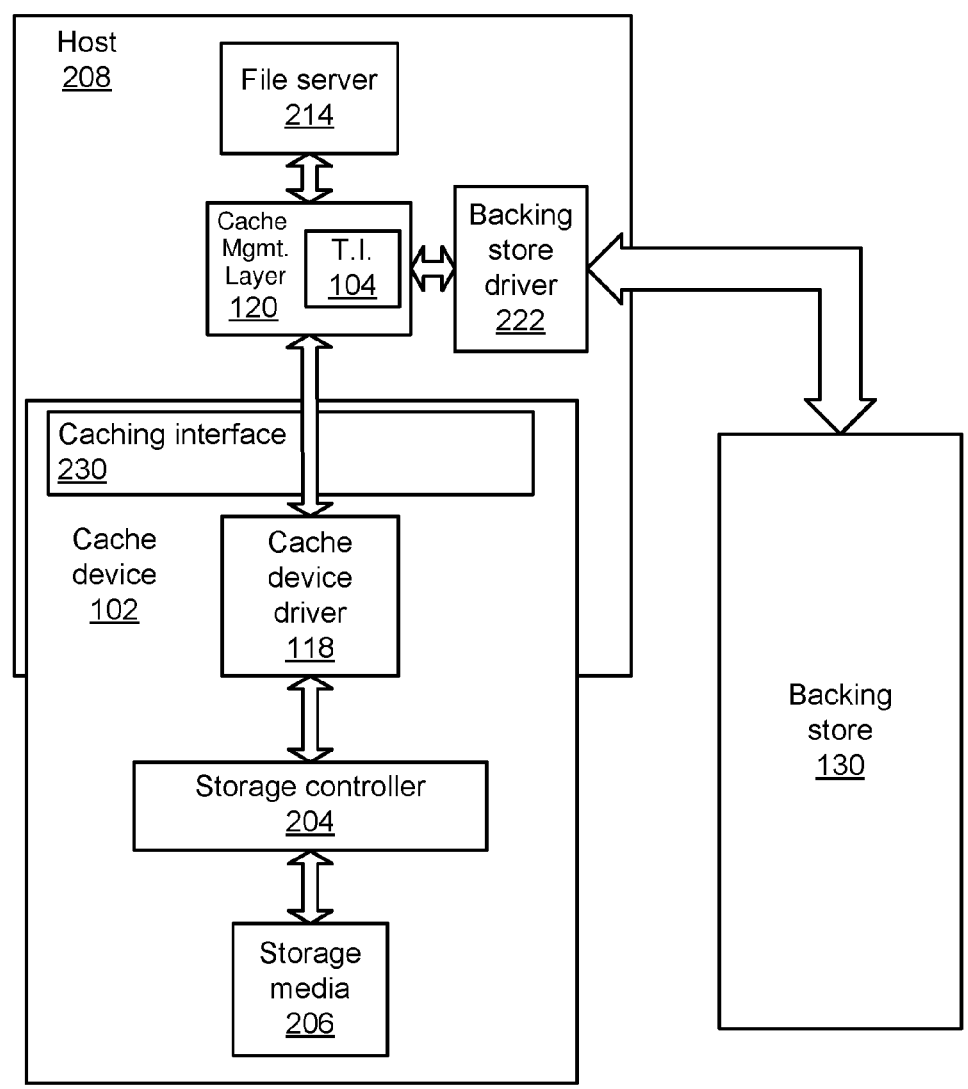
FIG. 2 illustrates another embodiment of the system for enabling atomicity for non-atomic-enabled devices.
Figure 3:
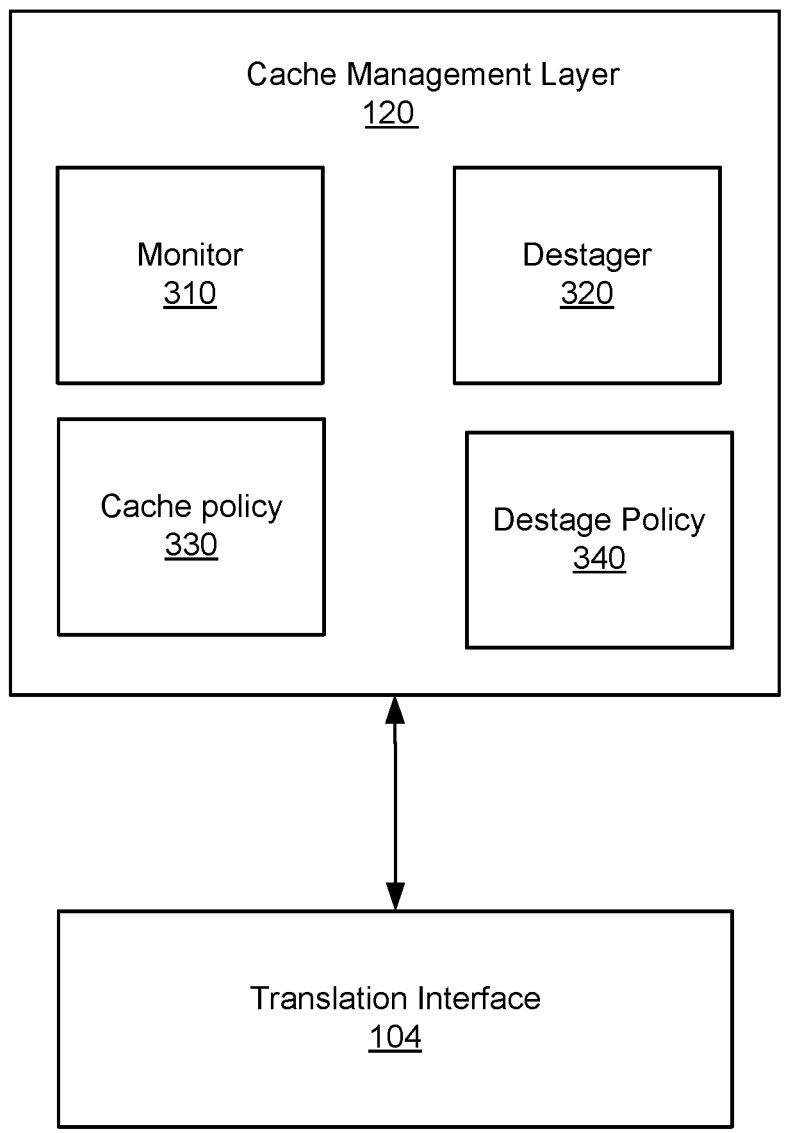
FIG. 3 illustrates one embodiment of a block diagram for a cache management layer.

The cache management layer 120, as will be described in greater detail below with reference to FIGS. 2 and 3, is configured to enable the functionality of atomicity, crash-recovery and/or data integrity features of the translation interface 104 and the cache device 102 for storage devices that are not natively capable of such functionality, such as the backing store 130.

The backing store 130 provides storage for data in the system 100. The backing store 130 may comprise one or more devices. For example, the backing store 130 may be made up of hard disk drives, solid state storage, tape, or other non-volatile media for storing data. The backing store 130 may be a SAN, a NAS, a RAID array, an ISCSI client, a JBOD, a volume or partition, or other storage device. In certain embodiments, the backing store 130 is a block device and interacts with the cache management layer 120 by way of a block device interface.

The cache management layer 120 may be implemented as a driver on the server 108, as software, as firmware, or as hardware. The cache management layer 120 may be implemented on the cache device 102. The cache management layer 120 may be a filter driver that interacts with the file system and/or operating system of a server 108, or other storage client 110 such as a database management system (DBMS). Components of the cache management layer 120 may also be distributed in the system 100. In certain embodiments, the cache management layer 120 dynamically changes the cache policy implemented on the cache device 102 as the cache device experience wear out and failure. The cache policies may be implemented to provide the best data protection and cache performance possible in view of the health of the cache device 102.

FIG. 2 presents a second embodiment of a system 200 which may benefit from enabling atomicity for non-atomic enabled devices. The system 200 includes a host 208, a file server 214, a cache management layer 120, a backing store driver 222, a cache device 102, a caching interface 230, a cache device driver 118, a storage controller 204, and storage media 206. The system 200, in certain configurations, may include different elements than those shown in FIG. 2.

The host 208 may be a computer (such as a laptop, blade server, desktop, etc). In the depicted embodiment, both the cache device 102 and the backing store 130 may be directly attached to a bus of the host 208. The cache device 102 may be used as a cache for the backing store 130.

The file server 214 may facilitate writing and reading data in the system 200. The file server 214 may be a file system responsible for organizing blocks and maintaining an address system. For example, the file server 214 may associate file names with blocks of storage. The file server 214 may use a file allocation table (FAT) filing system, hierarchical file system (HFS) Plus, or other file management approach. The operating system on the host 208 may provide the file server 214. The file server 214 may communicate with the cache management layer 120 using a storage interface.

The backing store driver 222 is a driver for the backing store 130. The cache management layer 120 may invoke routines of the backing store driver 222 which, in response, may issue commands to the backing store 130. The backing store 130, in response, may send data back to the backing store driver 222, which in turn may send data to the cache management layer 120 or otherwise invoke a routine in the cache management layer 120. For example, the cache management layer 120 may receive a write request from the file server 214, and determine that the data should be written to the backing store 130. The cache management layer 120 may invoke routines of the backing store driver 222 causing it to issue commands to the backing store which result in the data being written on the physical storage media of the backing store 130. The backing store 130 may provide the backing store driver 222 with an acknowledgement (commonly referred to as an ACK) indicating that the data was successfully written. The backing store driver 222 may send this ACK to the cache management layer 120. A similar process may be used for reads.

In one embodiment, the cache management layer 120 implements the above described functions of the translation interface 104. Alternatively, the translation interface 104 is integral to the cache management layer 120. The cache management layer 120 interfaces with a cache device driver 118 that is a driver for the cache device 102. The cache device driver 118 may be implemented as a driver on the host 208. In certain embodiments, the cache management layer 120 may include the cache device driver 118. The cache management layer 120 may also be configured to communicate directly with the storage controller 204 without an intermediate driver. The cache device driver 118 may be shared among multiple storage devices with individual storage controllers 204.

The storage controller 204 enables the storage and retrieval of data on the storage media 206. The storage controller 204 may perform various low-level operations necessary to write and read data from the storage media 206. The storage controller 204 may map logical identifiers to physical addresses on the storage media 206. The storage controller 204 may be a field programmable gate array (FPGA) such as a Xilinx® FPGA. The storage controller 204 may be an application specific integrated circuit (ASIC) or other customer logic solution. Various approaches may be used to create and configure a storage controller 204.

The storage media 206 is the physical media on which the data is stored. The storage media 206 may be disks, solid state media (such as NAND Flash), or other suitable storage media. In one embodiment, the storage media 206 is NAND Flash and is made up of banks of solid-state storage elements. The banks may be arranged in parallel. The cache device 102 may be configured to sequence execution of solid-state storage commands (such as reads and writes) such that a command of a first execution duration executes on a first bank concurrent with execution of a command of a second execution duration on a second bank. More detail on the possible arrangements of banks of solid-state storage can be found in U.S. application Ser. No. 11/952,095, filed on Dec. 6, 2007 entitled "Apparatus, System, and Method for Managing Commands of Solid-State Storage Using Bank Interleave," which application is hereby incorporated by reference.

The cache device 102 may also support error correcting code (ECC) chunks to protect data stored in the storage media 206. In certain embodiments, the cache device 102 generates ECC chunks comprising at least a portion of the received data, and an ECC code that is capable of correcting an error in the ECC chunk. The cache device 102 may store a portion of the ECC chunk on one solid-state storage element and also store a portion of the ECC chunk on a second solid-state storage element.

As noted above, the cache device 102 may interact with the cache management layer 120 by way of a block device interface. The cache management layer 120 and the cache device 102 may also interact using a caching interface 230. In certain embodiments, the caching interface 230 provides an interface by which the cache management layer 120 may communicate with the cache device driver 118. In other embodiments, the cache management layer 120 communicates with the storage controller 204 directly using the caching interface 230.

FIG. 3 shows one embodiment of a cache management layer 120 comprising a monitor 310, a destager 320, a cache policy 330, and a destage policy 340. In one embodiment, the monitor 310 identifies write operations that are intended for the backing store 130 of FIG. 1, or any other storage device that is not capable of atomic write operations. In a further embodiment, the write operations intended for the backing store 130 may not require atomicity. Stated differently, a data storage application, as described above, may have multiple classes of data, at least some of which require atomic writes. Beneficially, the cache management layer 120, via the monitor 310, is configured to identify the write operations requiring atomic writes and redirect those write operations to the translation interface 104.

The cache management layer 120 enables atomic writes for the backing store 130 by enabling write back mode for the cache device 102. In other words, the cache management layer 120 redirects write operations to the cache device 102, which are then written back to the backing store 130, via the destager 320. The destager 320 implements destage policies 340. The destage policies may identify the quantity and frequency of write operations to send to the backing store 130. For example, a destage policy 340 may specify that write operations to the backing store 130 from the cache device occur only when a utilization of the backing store 130 is at or below a certain threshold. The destager 320 is also configured to monitor the success or failure of the write operation to the backing store 130. If a write operation fails because of a hardware or power failure in the backing store, the destager 320 notifies the cache management layer 120 of the failure. The cache management layer 120 then notifies the translation interface 104, which then rolls back the write operations, using the log structure described above, when the backing store 130 is again available.

The cache management layer 120 ensures that all write operations to the backing store 130 are either successful, or rolled back to a state before the unsuccessful write operations began. The translation interface 104 maintains a copy (i.e., dirty copy) of the write operations in the cache device 102. When the translation interface 104 receives, from the cache management layer 120, notification that a write operation was successful, the translation interface 104 deletes the dirty copy of the write operations.

In one embodiment, the cache management layer 120 is configured to implement the cache policy 330. In certain embodiments, the cache policy 330 may, for example, be responsible for maintaining the data structures necessary to support the cache device 102. In one embodiment, the cache policy 330 tracks clean and dirty data in the cache device 102. The cache policy 330 may report dirty data to the cache device 102 such that the dirty data can be deleted after notification of a successful destage to the backing store 130. The cache policy 330 may also report dirty data to the cache device 102 such that the dirty data can be marked as invalid (and therefore candidate for garbage collection) in cache devices 102 that are solid state storage devices.

Figure 4:
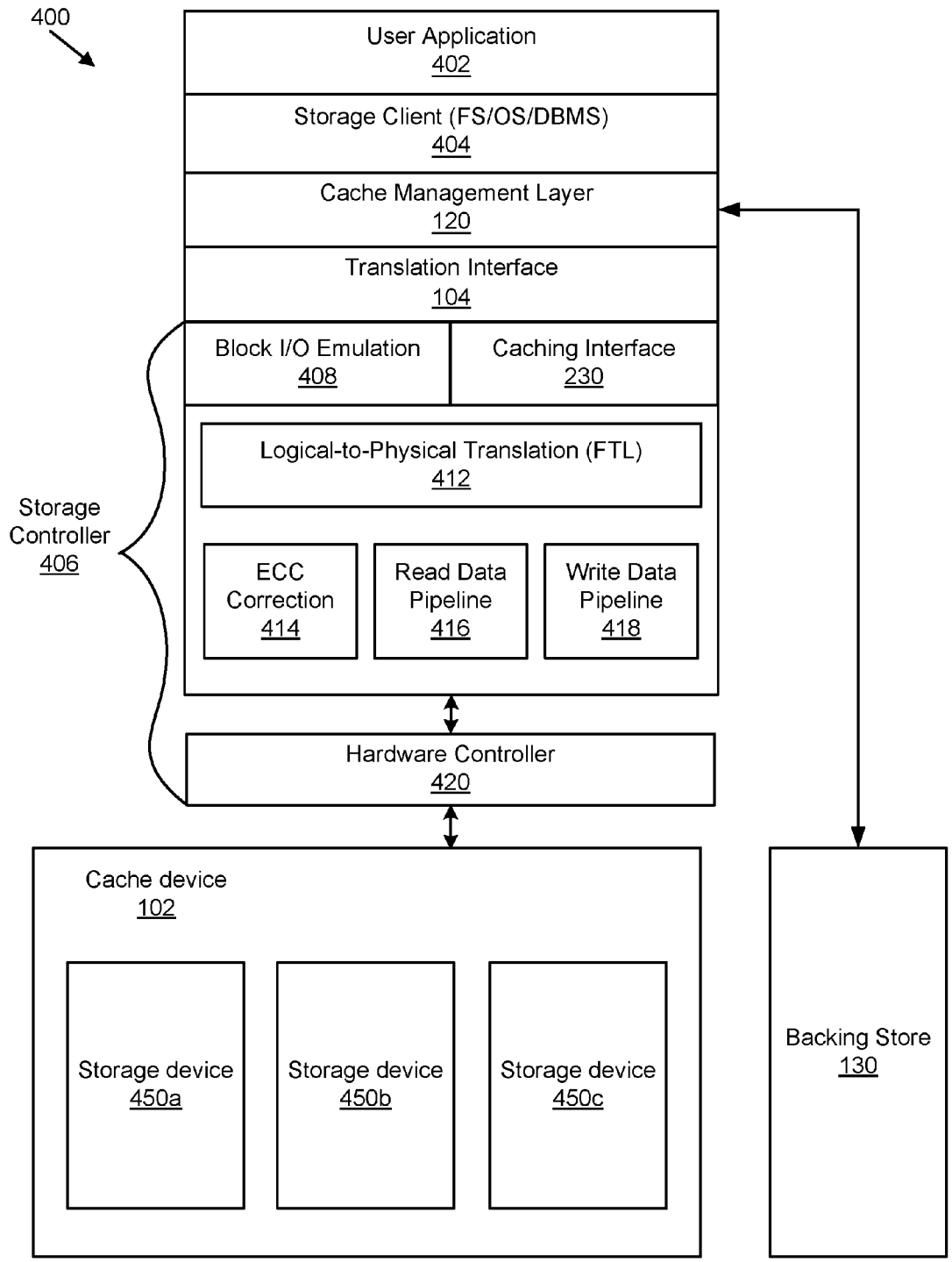
FIG. 4 illustrates one embodiment of a software stack representing the cache management layer and a cache device.

FIG. 4 is an illustration of one embodiment of a software stack representing an exemplary system in which a cache management layer 120 and a cache device 102 may be implemented. The system 400 may include a user application 402, a storage client 404, a cache management layer 120, a storage controller 406, a cache device 102 (including storage devices 550a-c), and a backing store 130.

User applications 402 may be any variety of application that may generate read and write requests. For example, the user application 402 may be a database management system (DBMS), a web browser, or other of the many varied applications that read and write data from storage. The storage client 404 manages file systems, files, data, and the like. The storage client 404 may be, for example, a server, a file system, an operating system, a volume manager, a DBMS, an application, an software developer kit (SDK) and the like. The user applications 402 may access the storage using the storage client 404.

The storage client 404 may be in communication with the cache management layer 120. In certain embodiments, the cache management layer 120 presents a block interface to the storage client 404 such that the cache management layer 120 appears to be a standard block storage device. In one embodiment, the cache management layer 120 communicates with the storage client 404 through an I/O interface represented by the block I/O emulation layer 408. The cache management layer 120 may identify itself as a standard block device to the storage client 504. As noted above, the cache management layer 120 may present a sparse address space to the storage client 404. The cache management layer 120 may similarly ensure that the cache device 102 and the backing store 130 are transparent to the storage client 404. The cache management layer 120 may similarly provide caching services in front of one or more physical devices (represented as storage devices 450a-c) that make up the cache device 102. The cache management layer 120 may hide from the storage client 504 that there are multiple physical storage devices 450a-c.

In certain embodiments, the cache management layer 120 also interfaces with the cache device 102 (by way of the storage controller 506) using a block I/O emulation layer 408. The cache management layer 120 may, for example, communicate with the cache device driver 118 of FIG. 2. In such embodiments, the cache management layer 120 may be able to work with a variety of different cache devices 102 by communicating with the driver for the cache device 102 using conventional protocols. In other embodiments, the cache management layer 120 may communicate directly with the storage controller 406 without an intermediate cache device driver 118.

As noted above, the cache management layer 120 may communicate with the cache device 102 using a caching interface 230. The caching interface 230 may allow the cache management layer 120 and the cache device 102 to exchange information that may be valuable in making decisions regarding the status of the cache device 102 (such as the cache device state), which cache members are candidates for eviction, and other parameters discussed above.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

The cache management layer 120, the cache device 102, and/or the backing store 130 may not directly or necessarily associate logical block addresses with particular physical blocks. The cache management layer 120, the cache device 102, and/or the backing store 130 may emulate a conventional block storage interface to maintain compatibility with block storage clients 404 and with conventional block storage commands and protocols.

A cache management layer 120 may store data on the cache device 102 and/or the backing store 130 as blocks, sectors, pages, logical blocks, logical pages, erase blocks, logical erase blocks, ECC chunks or in any other format or structure advantageous to the technical characteristics of the cache device 102 and/or the backing store 130. For example, in one embodiment, the backing store 130 comprises a hard disk drive and the cache management layer 120 stores data on the backing store as contiguous sectors of 512 bytes, or the like, using physical cylinder-head-sector addresses for each sector, logical block addresses for each sector, or the like. The cache management layer 120 may receive a logical address and a command from the storage client 404 and perform the corresponding operation in relation to the cache device 102 and/or the backing store 130. The cache management layer 120, the cache device 102, and/or the backing store 130 may support a block I/O emulation layer 408, a caching interface 230, or both a block I/O emulation layer 408 and a caching interface 230.

As described above, certain storage devices, while appearing to a storage client 404 to be a block storage device, do not directly associate particular logical block addresses with particular physical blocks, also referred to in the art as sectors. Such storage devices may use a logical-to-physical translation layer 412. The cache device 102 and the backing store 130 may each include a logical-to-physical translation layer 412. In another embodiment, the cache management layer 120 maintains a single logical-to-physical translation layer 412 for the cache device 102 and the backing store 130. In another embodiment, the cache management layer 120 maintains a distinct logical-to-physical translation layer 412 for each of the storage devices 450a-c and the backing store 130.

The logical-to-physical translation layer 412 provides a level of abstraction between the logical block addresses used by the storage client 504 and the physical block addresses at which the cache device 120 and the backing store 130 store the data. This mapping allows data to be referenced in a logical address space using logical identifiers, such as a logical block address. A logical identifier may not indicate the physical location of data in the cache device 102; a logical identifier may be an abstract reference to the data. For example, contiguous logical block addresses may be stored in non-contiguous physical block addresses as the logical-to-physical translation layer 412 determines the location on the physical media of the cache device 102 at which to perform data operations. The logical-to-physical translation layers 412 may each include a map or index that maps logical block addresses to physical block addresses. The map may be in the form of a b-tree, a content addressable memory (CAM), a binary tree, and/or a hash table, or the like. The logical-to-physical translation layer 412 may be a tree with nodes that represent logical block addresses and include references to corresponding physical block addresses.

The storage controller 406 may also include a read data pipeline 416 and a write data pipeline 418. The write data pipeline 418 may be used to generate ECC check bits may be stored with the associated data packets to constitute ECC chunks. The ECC check bits may be used to detect and correct errors in the ECC chunk. The write data pipeline 418 may also include input buffers, write synchronization buffers, and write buffers to enable sequencing execution of solid-state storage commands as described above. The read data pipeline 416 may include an ECC correction module, a depacketizer, an alignment module, read synchronization buffers, output buffers, and other components described in the aforementioned application which may be used for ECC correction and sequencing execution of solid-state storage commands.

In one embodiment, the translation interface 104 calculates ECC check bits for data that is destaged to the backing store 130. The cache device 102 stores the ECC check bits, and beneficially, reduces the overhead and storage requirements of the backing store 130.

As discussed above, the cache management layer 120 may interface with drivers for the cache device 102 and the backing store 130. In certain embodiments, the caching algorithms are implemented at the cache management layer 120 such that the cache management layer 120 determines where read and write operations should be directed. The cache management layer 120 is configured to notify the storage client 404 that the backing store 130 is available for atomic storage requests even though the backing store 130 may be incapable of processing atomic storage requests. The cache management layer 120 subsequently receives atomic storage requests from the storage client 404 and redirects the atomic storage requests to a storage device that is capable of processing the atomic storage requests. In one embodiment, the storage device is the cache device 102, via the translation interface 104. The translation interface 104, as stated above, is configured to store a copy of the atomic storage request in a log-based format in the cache device.

Figure 5:
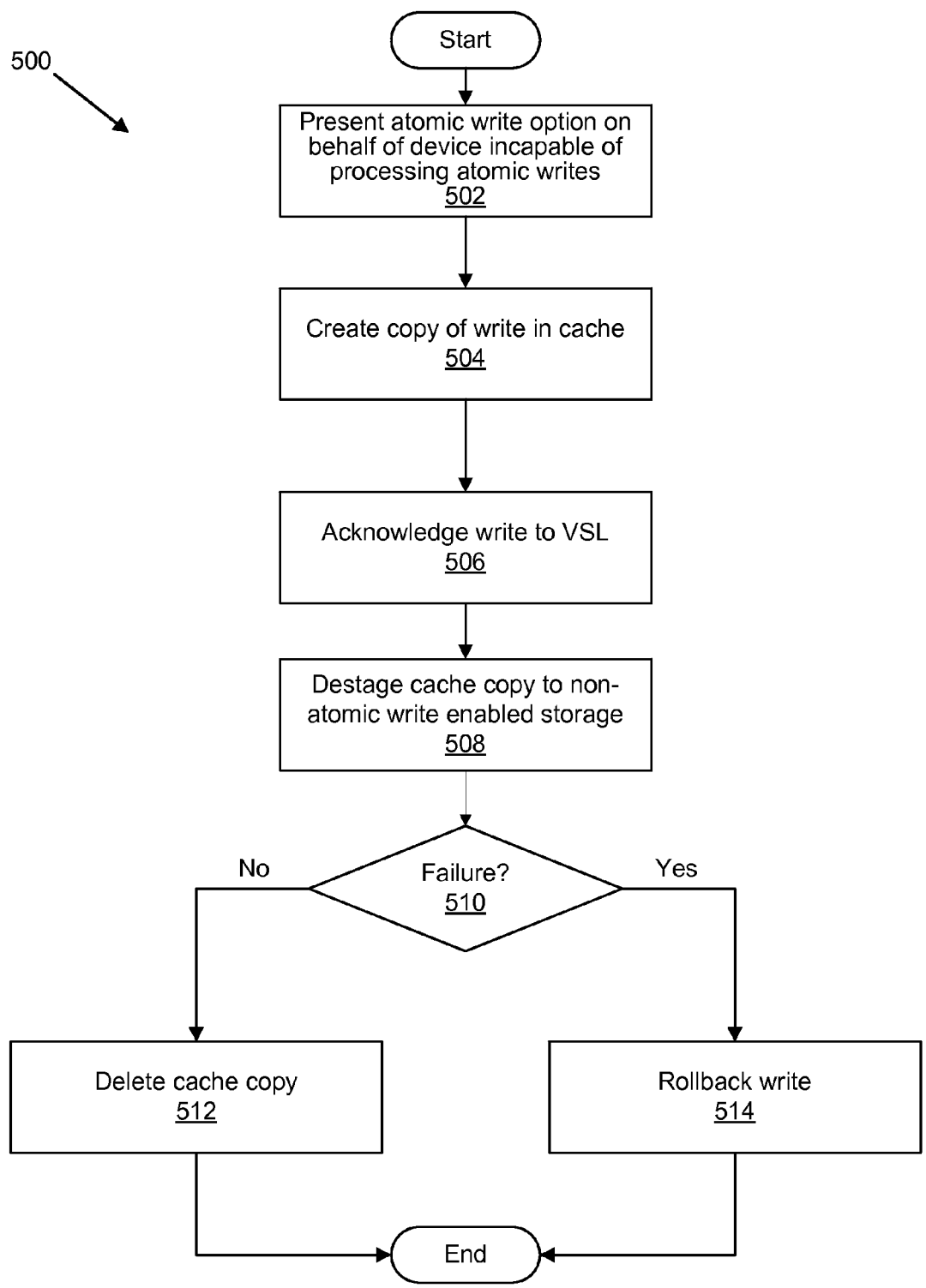
FIG. 5 is a schematic flow chart diagram illustrating one embodiment of a method for implementing atomic write capability.

FIG. 5 is a schematic flow chart diagram illustrating one embodiment of a method 500 for implementing atomic write capability for storage devices that are not capable of processing atomic write operations. Although the method 500 is shown and described with reference to the cache management layer 120 and the translation interface 104, other embodiments of the method 500 may be implemented with other controllers and/or memory devices.

The method 500 starts and the cache management layer 120 presents 502 atomic write capabilities for storage devices that do not natively have atomic write capability such as the backing store 130 of FIG. 1. For example, the cache management layer 120 provides an interface to a client 110, or user application 402 for enabling atomic write capability. In one embodiment, the interface is provided to a storage client as described above with reference to FIG. 4.

The cache management layer 120 then monitors write operations sent from clients 110 or storage clients 404 to the backing store 130. The monitor 310 identifies the write operations that request atomic write functionality and directs the write operations to the translation interface 104 which creates 504 a copy of the write operation in the cache device 102. The translation interface 104, in one embodiment, then sends an atomic write acknowledgement 506 of a successful write operation to the client via the cache management layer 120. In an alternative embodiment, the functionality of the translation interface 104 is implemented in the cache management layer 120.

At a convenient time, the translation interface 104 destages 508 the copy of the write operations stored in the cache device 102 to the backing store 130. For example, the translation interface 104 identifies an idle period, or an otherwise less than full utilization period, of the cache management layer 120 and the backing store 130 and the translation interface 104 destages the cache copy of the write operations to the backing store 130. In a further embodiment, the destage of the cache copy, or "dirty copy," occurs according to a cache policy, as described above with reference to FIG. 3. The cache policy may define certain time periods for destaging cache data to the backing store. In another embodiment, the cache policy may define a target storage utilization threshold, and whenever the storage utilization falls below the target threshold, the translation interface 104 is allowed to destage the dirty copy. In another embodiment, the cache policy may indicate that when a certain capacity is reached on the cache device 102, the translation interface 104 is allowed to destage the dirty copy of the data to free up space.

The translation interface 104 determines 510 if a failure occurred during the destage process based on a write confirmation received from the backing store. Examples of failures might include, but are not limited to, a loss of power during a destage write to the backing store, a communication error between the cache device 102 and the backing store 130, and a hardware failure of either the cache device 102 or the backing store 130. If a failure does not occur, the translation interface 104 deletes 512 the cache or dirty copy of the write operations. In other words, when a destage is successful, the cache copy of the write operations may be deleted from the cache device 102.

If, however, a failure occurs, the translation interface 104 is configured to rollback 514 the write operations. In one embodiment, the translation interface 104 utilizes the log structured format of the atomic write enabled cache device 102 to undo the failed write operations. The method 500 then ends.

While many embodiments are described herein, some embodiments relate to an apparatus. The apparatus includes an input/output (I/O) interface configured to couple the controller to an I/O buffer of a memory device. The apparatus includes a program module coupled to the I/O interface. The program module is configured to issue an instruction to the memory device to program data to the memory device via the I/O buffer. The apparatus includes a program suspend module coupled to the I/O interface. The program suspend module is configured to issue a suspend command to the memory device to suspend a program operation executing within the memory device in response to receiving a memory access request from an application to perform an operation at the memory device. The program suspend module is also configured to issue a resume command to the memory device to resume the program operation in response to completing the operation associated with the memory access request.

Other embodiments described herein relate to a memory device. The electronic memory device includes a memory array with a plurality of memory elements. Each memory element is configured to store data. The device includes an I/O buffer coupled to the memory array. The I/O buffer is configured to receive data from an input/output (I/O) interface of a memory device controller and write the data to the memory array. The device includes a memory control manager coupled to the memory array. The memory control manager is configured to pause a program operation to the memory array in response to receiving a pause command.

Other embodiments described herein relate to a method for suspending a program operation in a memory device. The method includes performing a portion of the program operation including receiving data from an input/output (I/O) interface of a memory device controller and writing the data to a memory array. The method also includes receiving a memory access request to the memory device. The method also includes suspending the program operation in response to receiving the memory access request. The method also includes performing an operation for the memory access request.

Other embodiments described herein relate to a system. The system includes means for writing data to a memory device. The memory device includes a memory array with a plurality of memory elements. Each memory element is configured to store data. The system includes means for suspending a program operation to the memory array in response to receiving a memory access request to the memory device. The system includes means for resuming the program operation in response to completing an operation associated with the memory access request.

An embodiment of the electronic memory device controller includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or memory devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method, comprising:
   receiving an atomic storage request for a first storage device;
   servicing the atomic storage request using a second storage device, separate from the first storage device, the second storage device comprising a log structure, the log structure persisting an order of storage operations performed on the second storage device and including data to be invalidated by the atomic storage request, wherein servicing the atomic storage request comprises:
   storing the data of the atomic storage request within the log structure of the second storage device,
   retaining the data to be invalidated by the atomic storage request within the log structure of the second storage device such that the atomic storage request is capable of being rolled back on the second storage device by use of the retained data and the order of storage operations persisted by the log structure, and
   recording that the data of the atomic storage request stored within the log structure is dirty;
   writing the data of the atomic storage request stored within the log structure of the second storage device to the first storage device in a plurality of destage operations, in response to storing the data of the atomic storage request within the log on the second storage device;
   recording that the data of the atomic storage request stored within the log structure is clean in response to successful completion of all of the plurality of destage operations; and
   rolling back one or more completed destage operations on the first storage device by use of the retained data and the order of storage operations persisted within the log structure of the second storage device in response to a failure of one or more of the plurality of destage operations.

2. The method of claim 1, further comprising acknowledging completion of the atomic storage request in response to storing the data of the atomic storage request within the log structure of the second storage device.

3. The method of claim 1, further comprising: determining that all of the plurality of destage operations were completed successfully in response to receiving one or more acknowledgements from the first storage device.

4. The method of claim 1, wherein the destage operations comprise cache write back operations.

5. The method of claim 1, further comprising evicting the data of the atomic storage request from the second storage device subsequent to recording that the data of the atomic storage request stored within the log structure is clean.

6. The method of claim 1, wherein the data of the atomic storage request is stored within the log structure of the second storage device in a plurality of append operations, the method further comprising:
rolling back one or more completed append operations from the log in response to a failure of one or more of the plurality of append operations.

7. The method of claim 1, further comprising notifying a storage client of a capability to process the atomic write operation on behalf of the first storage device that is incapable of processing atomic write operations.

8. An apparatus, comprising:
a cache manager configured to receive an atomic storage request directed to a backing store; and
a cache storage device configured to implement a first atomic transaction on a non-volatile storage medium, comprising:
appending a data set corresponding to the atomic storage request to a log maintained on the non-volatile storage medium, the log comprising an ordered sequence of storage operations performed on the non-volatile storage medium, including data to be invalidated by the atomic storage request,
retaining the data to be invalidated by the atomic storage request within the log such that the atomic storage request is capable of being rolled back on the non-volatile storage medium by use of the data retained within the ordered sequence of storage operations of the log, and
marking the data set appended to the log as being non-discardable from the non-volatile storage medium,
wherein the cache manager is further configured to implement a second atomic transaction, comprising:
directing the cache storage device to write the data set appended to the log on the non-volatile storage medium to the backing store in a plurality of write operations,
marking the data set as being discardable from the non-volatile storage medium in response to successful completion of all of the plurality of write operations, and
rolling back one or more completed write operations from the backing store by use of the data retained within the ordered sequence of storage operations of the log on the non-volatile storage medium in response to a failure of one or more of the plurality of write operations.

9. The apparatus of claim 8, wherein the cache manager is configured to acknowledge completion of the atomic storage request in response to one of: appending the data set corresponding to the atomic storage request to the log, and writing the data set corresponding to the atomic storage request to the backing store.

10. The apparatus of claim 8, wherein the cache storage device is configured to cache the data set corresponding to the atomic storage request in a write back cache mode.

11. The apparatus of claim 8, wherein the cache manager is configured to monitor a utilization of the backing store and to direct the cache storage device to write the data set to the backing store in response to a monitored utilization of the backing store being below a threshold.

12. The apparatus of claim 8, wherein the cache manager is configured to direct the cache storage device to write the data set to the backing store according to a predetermined schedule.

13. The apparatus of claim 8, wherein the cache manager is configured to direct the cache storage device to write the data set to the backing store in response to determining that an available capacity of the cache storage device is less than a threshold.

14. The apparatus of claim 8, wherein the cache storage device is configured to:
append the data set corresponding to the atomic storage request to the log in a plurality of log storage operations; and
roll back one or more completed log storage operations from the log in response to a failure of one or more of the plurality of log append operations.

15. The apparatus of claim 8, wherein the cache manager is configured to evict the data set from the cache storage device subsequent to marking the data set as discardable.

16. The apparatus of claim 8, wherein the cache manager is configured to update a logical-to-physical translation layer to associate the data set appended to the log maintained on the non-volatile storage medium with respective logical addresses.

17. A memory device, comprising:
a storage controller configured to store data within a log on a non-volatile memory, the log comprising data stored in a log-based format that persists an ordering of storage operations performed on the non-volatile memory, the storage controller further configured to process atomic storage requests addressed to a backing store, wherein processing an atomic storage request comprises:
performing a first atomic transaction on the non-volatile memory, comprising:
writing the data of the atomic storage request to the log, the data of the atomic storage request marked as non-evictable from the non-volatile memory, and
preserving data to be invalidated by the atomic storage request within the log such that the first atomic transaction is capable of being rolled back on the non-volatile memory by use of the preserved data and ordering of storage operations persisted within the log on the non-volatile storage medium; and
performing a second atomic transaction on the backing store, comprising:
destaging the data of the atomic storage request from the log on the non-volatile storage medium to the backing store in a plurality of write operations,
marking that the data of the atomic storage request is evictable from the non-volatile storage medium in response to completion of all of the plurality of write operations, and
rolling back one or more completed write operations from the backing store by use of the preserved data and ordering of storage operations persisted within the log on the non-volatile memory in response to a failure of one or more of the plurality of write operations.

18. The memory device of claim 17, wherein the storage controller is further configured to acknowledge completion of the atomic storage request in response to one or more of: completing the first atomic transaction, and completing the second atomic transaction.

19. The memory device of claim 17, wherein the storage controller is further configured to evict the data of the atomic storage request from the non-volatile memory in response to marking the data of the atomic storage request as evictable.

20. A system, comprising:
  means for processing an atomic storage request directed to a backing store comprising:
    means for appending data of the atomic storage request to a log maintained on a non-volatile memory, the log comprising an ordered sequence of storage operations performed on the non-volatile memory, including data to be invalidated by the atomic storage request;
    means for designating that the data of the atomic storage request appended to the log on the non-volatile memory comprises dirty data that must be retained on the non-volatile memory;
    means for retaining data to be invalidated by the atomic storage request within the log such that the atomic storage request is capable of being rolled back on the non-volatile memory by use of the retained data within the ordered sequence of storage operations of the log maintained on the non-volatile memory;
    means for destaging the data of the atomic storage request to the backing store in a plurality of write operations;
    means for designating that the data of the atomic storage request appended to the log on the non-volatile memory comprises clean data that can be evicted from the non-volatile memory in response to completion of all of the plurality of write operations; and
    means for rolling back one or more completed write operations from the backing store by use of the retained data within the ordered sequence of storage operations of the log maintained on the non-volatile memory in response to a failure of one or more of the plurality of write operations.

21. The system of claim 20, wherein the means for destaging comprises means for performing a plurality of write back operations.

22. The system of claim 20, wherein the means for destaging comprises:
  means for determining a utilization of the backing store; and
  means for performing write operations of the plurality of write operations in response to the determined utilization of the backing store is below a threshold.

23. The system of claim 20, wherein the means for destaging comprises:
  means for determining an available capacity of the non-volatile memory; and
  means for performing the plurality of write operations in response to determining that the available capacity of the non-volatile memory is less than a threshold.

24. The system of claim 20, further comprising means for acknowledging completion of the atomic storage request in response to one or more of: appending the data of the atomic storage request to the log on the non-volatile memory, and destaging the data of the atomic storage request to the backing store.

25. The system of claim 20, further comprising means for evicting the data of the atomic storage request from the non-volatile memory.

* * * * *